United States Patent [19]

Kadambi et al.

[11] Patent Number: 4,596,690
[45] Date of Patent: Jun. 24, 1986

[54] FISSION GAS RELEASE RESTRICTOR FOR BREACHED FUEL ROD

[75] Inventors: N. Prasad Kadambi, Gaithersburg, Md.; Roger W. Tilbrook, Monroeville, Pa.; Daniel R. Spencer, Unity Twp., Pa.; Ambrose L. Schwallie, Greensburg, Pa.

[73] Assignee: The United States of America as represented by the United States Department of Energy, Washington, D.C.

[21] Appl. No.: 564,061

[22] Filed: Dec. 21, 1983

[51] Int. Cl.[4] ............................................ G21C 3/00
[52] U.S. Cl. ...................................... 376/418; 376/456
[58] Field of Search ................. 376/418, 409, 413, 456

[56] References Cited

U.S. PATENT DOCUMENTS

| | | | |
|---|---|---|---|
| 2,798,848 | 7/1957 | Kingdon | 376/418 |
| 3,111,476 | 11/1963 | Sterry | 376/418 |
| 3,356,585 | 12/1967 | Zebroski | 376/418 |
| 3,633,033 | 1/1972 | Cottam | 376/418 |
| 3,697,377 | 10/1972 | Gauthron | 376/418 |
| 3,772,147 | 11/1973 | Bratton | 376/418 |
| 3,801,447 | 4/1974 | Heenan | 376/418 |
| 3,886,037 | 5/1975 | Schlenker | 376/418 |
| 3,954,559 | 5/1976 | Oguma | 376/418 |
| 3,996,100 | 12/1976 | Oguma | 376/418 |
| 4,010,069 | 3/1977 | Jung | 376/418 |

FOREIGN PATENT DOCUMENTS 954718  4/1964  United Kingdom .

Primary Examiner—Donald P. Walsh
Attorney, Agent, or Firm—Robert J. Fisher; Arthur A. Churm; Judson R. Hightower

[57] ABSTRACT

In the event of a breach in the cladding of a rod in an operating liquid metal fast breeder reactor, the rapid release of high-pressure gas from the fission gas plenum may result in a gas blanketing of the breached rod and rods adjacent thereto which impairs the heat transfer to the liquid metal coolant. In order to control the release rate of fission gas in the event of a breached rod, the substantial portion of the conventional fission gas plenum is formed as a gas bottle means which includes a gas pervious means in a small portion thereof. During normal reactor operation, as the fission gas pressure gradually increases, the gas pressure interiorly of and exteriorly of the gas bottle means equalizes. In the event of a breach in the cladding, the gas pervious means in the gas bottle means constitutes a sufficient restriction to the rapid flow of gas therethrough that under maximum design pressure differential conditions, the fission gas flow through the breach will not significantly reduce the heat transfer from the affected rod and adjacent rods to the liquid metal heat transfer fluid flowing therebetween.

10 Claims, 9 Drawing Figures

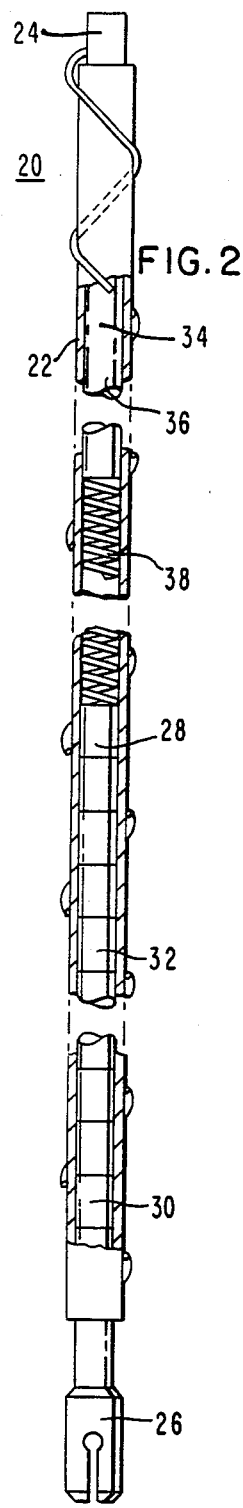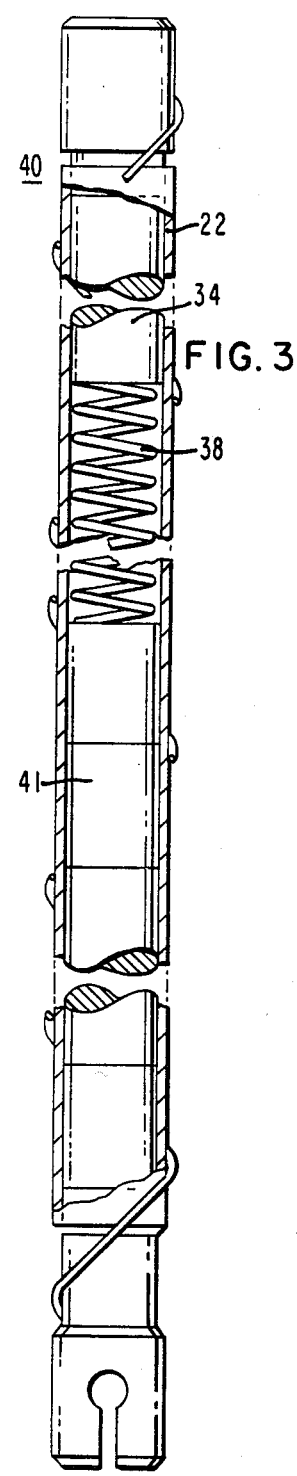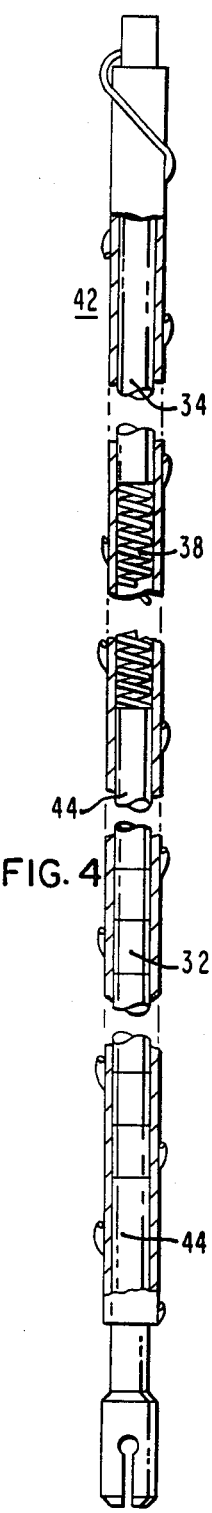

FISSION GAS RELEASE RESTRICTOR FOR BREACHED FUEL ROD

GOVERNMENT CONTRACT

This invention was conceived during performance of a contract with the U.S. Government designated DE-AM02-76CH94000.

BACKGROUND OF THE INVENTION

This invention relates to rods for liquid-metal-cooled nuclear reactors and, more particularly, to a structure to restricting the release rate of fission gas from a rod in the case of any breach in the rod cladding.

A nuclear rod or pin contains gas which is under pressure. At the beginning of life, the gas is predominantly fill gas such as helium, any water vapor evolved from the fuel or blanket pellets, and tag gas if used. A representative gas pressure at the beginning of life is in the order of 50 psia. During operation, gas is generated by the fission of heavy atoms, either directly or as daughter products. This gas is primarily krypton or xenon or mixtures thereof and the gas pressure at the end of life may be in the range of 800 to 1500 psia, depending upon core design, fuel design and fuel location and/or management scheme.

Containment for individual rods comprises a hollow continuous cladding member having the ends thereof sealed and if a breach occurs in the continuity of the cladding member, fission gas will be released from the rod. Depending upon the range of assumptions which are applied, for example, breach location, breach size, pellet/clad gap, pressure drop factors, time in life, number of rods failing simultaneously, the consequences of fission gas release are predicted to cover a wide range of rod gas blanketing and temperature conditions. Although in actual practice, major fission gas releases have never been observed, and cladding breaches experienced to date have been benign, possible extreme accident sequences remain under study. In order to ensure maximum possible safety, it is desirable to minimize the possible deleterious effects of any breach in the cladding which might result in gas blanketing of the breached rod and operating rods adjacent thereto, which blanketing could impair the heat transfer to the liquid coolant.

SUMMARY OF THE INVENTION

There is provided a sealed rod intended for vertical operation with a plurality of closely spaced, vertically oriented rods in a liquid-metal-cooled nuclear reactor. During reactor operation, the closely spaced rods have heat transfer liquid metal flowing upwardly therebetween and in contact therewith to remove generated heat therefrom. The rod comprises an outer elongated hollow continuous cladding member having the ends thereof sealed. Pellet means are positioned within the rod and are operable during reactor operation to generate heat and fission gas. Compression spring means within the rod are operable to retain the pellet means in position prior to operation thereof, and space within the rod comprises elongated gas plenum means to receive the fission gas which is evolved during reactor operation.

In accordance with the present invention, elongated gas bottle means is positioned within the elongated gas plenum means and occupies the substantial portion of the elongated gas plenum means. The gas bottle has an elongated wall portion spaced from the interior surface of the hollow cladding member to permit the passage of fission gas therebetween, and substantially all of the gas bottle means is impervious to the passage of fission gas therethrough. A gas pervious means is provided through a small portion of the gas bottle means to permit fission gas introduced into the gas plenum during reactor operation to pass into the gas bottle to equalize the fission pressure interiorly of and exteriorly of the gas bottle. The gas pervious means is sufficiently restrictive to the flow of fission gas that in the event of any breach in the continuity of the cladding member which decreases the fission gas pressure exteriorly of the gas bottle, the gas flow rate through the gas pervious means under maximum design pressure differential conditions is sufficiently restricted that fission gas released through the breach in the cladding member will not significantly reduce the heat transfer from the rod and rods proximate thereto to the heat transfer liquid metal flowing therebetween.

BRIEF DESCRIPTION OF THE DRAWINGS

For a better understanding of the invention, reference may be had to the preferred embodiments, exemplary of the invention, shown in the accompanying drawings, in which:

FIG. 2 is an elevational view of a fuel rod, shown partly in section, setting forth the essential elements of a conventional fuel rod;

FIG. 3 is an elevational view, shown partly in section, of a radial blanket rod showing the essential elements thereof;

FIG. 4 is an elevational view, shown partly in section, showing the essential elements of a rod for the Fast Test Reactor (FTR);

DESCRIPTION OF THE PREFERRED EMBODIMENTS

Figure 1:
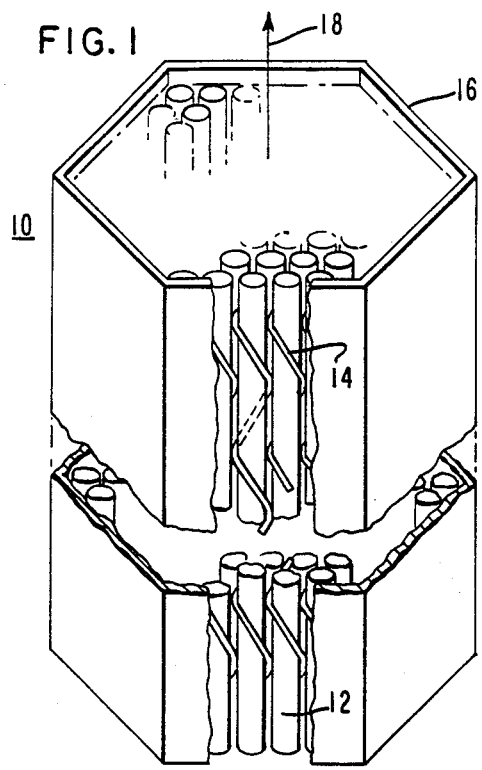
FIG. 1 is an isometric view of a portion of a fuel assembly, partly broken away, showing the general assembly structure with the flow path of coolant indicated thereon.

The present fuel rod is intended for vertical operation with a plurality of closely spaced, vertically oriented rods in a liquid-metal-cooled nuclear reactor and a section of a typical fuel assembly 10 is shown in FIG. 1. A plurality of individual rods 12 are arranged in closely spaced relationship with the spacing therebetween controlled by a wire wrapping 14. Grid spacers may also be used. The rods are retained in a hexagonally shaped duct 16 and during operation, liquid metal flows upwardly therebetween and in contact with the individual rods 12 in order to remove generated heat therefrom.

The flow path of the liquid metal, such as sodium, is indicated by the arrows 18.

The present rod construction can be used in conjunction with fuel rods, blanket rods, or fuel rods for fast flux test reactor and such rods are typically represented in FIGS. 2, 3 and 4. First considering FIG. 2, the fuel rod 20 is intended for use with a liquid-metal fast-breeder reactor and the rod comprises an outer elongated hollow continuous cladding member 22 having the ends sealed by suitable end caps or plugs 24, 26. Upper blanket pellets 28 and lower blanket pellets 30 are positioned on either side of fuel pellets 32 which are positioned in predetermined locations within the fuel rod 20 and are operable during reactor operation to generate heat as well as fission gas. An elongated space within the rod 20 comprises an elongated gas plenum 34 means to receive fission gas which is evolved during reactor operation. In this embodiment, the gas plenum 34 is defined by a spacer element 36. A compression spring means 38 within the fuel rod operates to retain the pellets in position within the fuel rod prior to operation thereof. Thus the spacer tube or element 36 functions to provide a load path between the spring and the pellet stack or end cap 24. During reactor operation, the spring 38 loses its strength and exerts negligible or zero force on the pellet stack which is free to expand.

The radial blanket rod 40 shown in FIG. 3 is generally similar in construction to that used for the fuel rod 20 except that all of the pellets 41 are formed as blanket pellets. During operation, these radial blanket pellets 41 generate heat and fission gas which is collected in the fission gas plenum 34.

In FIG. 4 is shown a fuel rod 42 for the fast flux test reactor which is generally similar in design to the previous reactors except that the fuel pellet stack 32 has reflectors or shields 44 in place of the blanket pellets. These shields can have a variety of designs and as an example, each of the shields 44 can comprise an elongated member formed of a high nickel-chromium iron alloy such as "Inconel".

The rod designs as shown in FIGS. 2-4 are subject to considerable variation. For example, the elongated fission gas plenum 34 can be varied in position so as to be located either above or below the compression spring 38 or the fission gas plenum 34 can be positioned beneath the pellets. The pellet positioning can be varied considerably with reactor design. Conventional tag gas capsules can be incorporated into each of the rod embodiments in varying locations, if desired.

Figure 5:
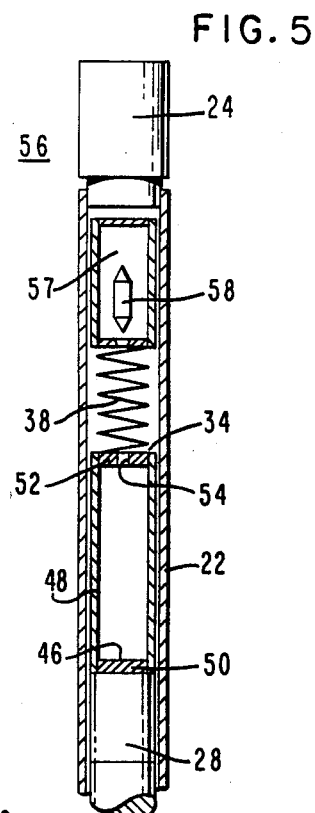
FIG. 5 is a sectional view of a portion of a rod which incorporates one embodiment of a gas bottle for fission gas.

In FIG. 5 is shown a schematic view, not to scale, of the upper portion of a typical rod wherein the fission gas plenum has been modified in accordance with the present invention. In this construction, the elongated gas plenum 34 has an elongated gas bottle means 46 positioned within the plenum 34 and occupying the substantial portion of the plenum 34. The gas bottle means 46 has an elongated wall portion 48, which in this embodiment comprises the spacer tube as previously used, with the bottle lower end portion sealed by a suitable plug 50 and the upper portion sealed by a plug 52 which is provided with a small aperture 54. Except for the aperture 54, all of the gas bottle means 46 is impervious to the passage of fission gas therethrough.

The aperture 54 comprises a gas pervious means which is provided through a small portion of the gas bottle means 46 to permit fission gas introduced into the elongated gas plenum 34 during reactor operation to pass into the gas bottle means 46 to equalize the fission gas pressure interiorly of and exteriorly of the gas bottle means 46. The gas pervious means 54 is sufficiently restrictive to the flow of fission gas that in the event of any breach in the continuity of the cladding member 22 which decreases the fission gas pressure exteriorly of the gas bottle means, the gas flow rate through the gas pervious means under maximum design pressure differential conditions is sufficiently restricted that fission gas release through the breach in the cladding member 22 will not sufficiently reduce the heat transfer from the rod and operating rods proximate thereto to the heat transfer liquid metal flowing therebetween. The modified rod 56 as shown in FIG. 5 is of generally conventional construction with respect to the cladding 22, upper end cap or plug member 24, compression spring member 38 and upper blanket pellets 28, which may be replaced by a reflector in the case of an FTR rod. The tag gas capsule arrangement 57 is conventional. After the rod is fabricated, a magnetically actuated member 58 pieces the capsule 57 to release the tag gas into the rod.

Figure 6:
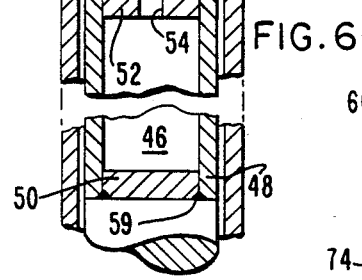
FIG. 6 is an enlarged fragmentary sectional view showing construction details for the gas bottle.

The constructional details for the gas bottle 46 are shown in the enlarged sectional view of FIG. 6 wherein the lower end plug 50 is affixed to the longitudinal wall 48 of the gas bottle 46 by a circumferential weld 59. In similar fashion, the upper end plug 52 is affixed to the longitudinal wall 48 by a circumferential weld 60. The dimensions of the aperture 54 will vary with the designs intended for the rod under consideration. For the experimental breeder reactor (EBR-II) wherein the fission gas plenum has a volume of about 0.5 cubic inch (8.2 cc), and using a maximum gas pressure within the gas bottle of 1000 psia krypton and xenon, a maximum gas flow rate through the aperture 54 of 0.1 gram per second in the case of a breach in the cladding member 22 should be adequate to ensure that no significant gas blanketing of the fuel rods will occur. This flow rate, of course, will vary for different designs and larger fuel pins or rods will have a larger gas volume in the plenum. This flow rate was calculated using an atom ratio of krypton and xenon of 0.15:0.85. For such design parameters, a single aperture having a diameter of 0.002 inch (0.07 mm) is suitable. The aperture 54 can be provided in different locations. It is preferable that the gas pervious means, whatever its form, be positioned at the upper end of the gas bottle, in order to increase the length of the path the fission gas must traverse and to locate the gas pervious means distant from the fuel to minimize fission product fouling.

Figure 7:
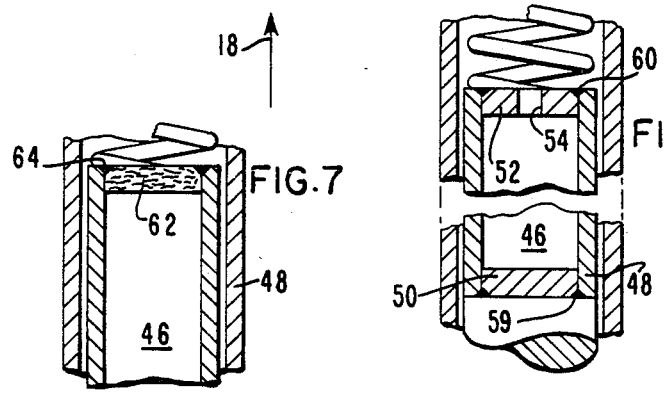
FIG. 7 is an enlarged fragmentary sectional view of an alternative gas bottle arrangement.

An alternative construction for the gas pervious means is shown in FIG. 7 wherein the end closure member 52 is replaced by a porous member 62 circumferentially welded at 64 to the longitudinal wall 48.

Figure 8:
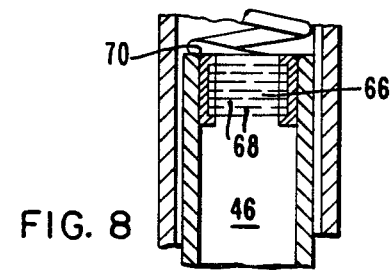
FIG. 8 is an enlarged fragmentary sectional view of another alternative gas bottle arrangement.

Another modification for the gas pervious member is shown in FIG. 8 wherein a series of adjacent plates 66 which have offsetting apertures 68 are affixed within the end portion of the gas bottle means 46 and suitably retained in position by a circumferential weld 68.

Many other constructions for the gas pervious means can be readily envisioned. In any of these embodiments, the fission gas which is introduced into the elongated gas plenum 34 during reactor operation will readily pass into the gas bottle 46 through the gas pervious means in order to equalize the fission gas pressure interiorly of and exteriorly of the gas bottle. Any of these gas pervious means, however, should be sufficiently restrictive to the flow of fission gas that in the event of any breach in the continuity of the cladding member 22 which decreases the fission gas pressure exteriorly of the gas bottle, the gas flow rate through the gas pervious means under maximum design pressure differential conditions will be sufficiently restricted that fission gas released through the breach in the cladding member 22 will not significantly reduce the heat transfer from the fuel rod and the operating rods proximate thereto to the heat transfer liquid metal flowing therebetween, see FIG. 1.

Figure 9:
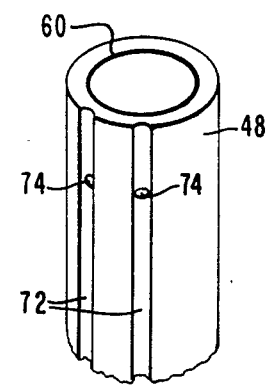
FIG. 9 is a fragmentary isometric view of a modified gas bottle wherein longitudinal grooves are provided on the outer wall surface of the gas bottle and apertures are provided through the side wall.

In its preferred form, the cladding member 22 has a tubular configuration and the elongated wall 48 of the gas bottle 46 is formed with a tubular configuration which closely interfits into the cladding member 22 with a restricted gas path maintained between the inner surface of the cladding member 22 and the outer surface of the elongated wall portion 48 of the gas bottle 46. In the preferred construction, the gas bottle is positioned adjacent the compression spring although modified constructions can be used. For some embodiments, it is necessary to ensure that a restricted gas path is always maintained between the outer surface of the gas bottle wall 48 and the inner surface of the cladding member 22. This is readily achieved by providing one or more longitudinal grooves 72 in the outer surface of the elongated wall portion 48 and such an embodiment is shown in FIG. 9. The embodiment shown in FIG. 9 is also modified by providing one or more apertures 74 which constitute the gas pervious means in the upper side wall portion of the gas bottle and these apertures 74 open into the longitudinal grooves 72.

As an alternative embodiment, the gas bottle means 46 can be constructed of two or more individual bottles which occupy the substantial portion of the elongated gas plenum 34. The compression spring means 38 can be placed in a variety of locations and it can be positioned either above the gas bottle or beneath the gas bottle. Also, more than one spring can be used if desired.

As a detailed example, for use with the experimental breeder reactor designated EBR-II, a fuel rod which incorporates the present gas-bottle has the following dimensions:

| | |
|---|---|
| Total rod length | 40 inches (101.6 cm) |
| Spring length (initial) | 2.446 inches (6.26 cm) |
| Spring positioned at upper end of fuel rod and above gas bottle | |
| Gas bottle length | 12.722 inches (32.31 cm) |
| Insulator pellets | 0.50 inch (1.27 cm) |
| Positioned immediately above and beneath fuel pellets - length of each | |
| Fuel pellets - length | 13.5 inch (34.29 cm) |
| Length of upper end cap | 3.00 inch (7.62 cm) |
| Length of lower end cap | 2.765 inch (7.02 cm) |
| Length of tag gas capsule | 3.12 inch (7.92 cm) |
| Positioned next to lower end cap | |
| "Inconel" reflector cylinder length | 1.427 inch (3.62 cm) |
| Positioned above the gas capsule | |
| O.D. of cladding member | 0.275 inch (0.7 cm) |
| Cladding wall thickness | 0.0145 inch (0.036 cm) |
| Spacing between gas bottle and cladding member | 0.008 inch (.02 cm) |
| Gas bottle wall thickness | 0.015 inch (.038 cm) |
| Diameter of single aperture in top portion of bottle | 0.0028 inch (0.086 mm) (.07 mm) |
| Maximum design pressure for gas bottle | 1000 psia |

We claim:

1. A sealed rod intended for vertical operation with a plurality of closely spaced, vertically oriented rods in a liquid-metal-cooled nuclear reactor, during reactor operation said closely spaced rods having heat transfer liquid metal flowing upwardly therebetween and in contact therewith to remove generated heat therefrom;

said rod comprising an outer elongated hollow continuous cladding member having the ends thereof sealed, pellet means positioned within said rod and operable during reactor operation to generate heat and fission gas, compression spring means within said rod to retain said pellet means in position within said rod prior to operation thereof, and space within said rod comprising elongated gas plenum means to receive fission gas which is evolved during reactor operation;

elongated gas bottle means positioned within said elongated gas plenum means and occupying the substantial portion of said elongated gas plenum means, said gas bottle means having an elongated wall portion spaced from the interior surface of said hollow cladding member to permit the passage of fission gas therebetween, and substantially all of said gas bottle means being impervious to the passage of fission gas therethrough;

gas pervious means provided through a small portion of said gas bottle means to permit fission gas introduced into said elongated gas plenum means during reactor operation to pass into said gas bottle means to equalize the fission gas pressure interiorly of and exteriorly of said gas bottle means, said gas pervious means being sufficiently restrictive to the flow of fission gas that in the event of any breach in the continuity of said cladding member which decreases the fission gas pressure exteriorly of said gas bottle means, the gas flow rate through said gas pervious means under maximum design pressure differential conditions is sufficiently restricted that fission gas release through the breach in said cladding member will not significantly reduce the heat transfer from said rod and rods proximate thereto to the heat transfer liquid metal flowing therebetween.

2. A sealed fuel rod intended for vertical operation with a plurality of similar, closely spaced, vertically oriented fuel rods in a liquid-metal fast-breeder reactor, during reactor operation said closely-spaced fuel rods having heat transfer liquid metal flowing upwardly therebetween and in contact therewith to remove generated heat therefrom;

said fuel rod comprising an outer elongated hollow continuous cladding member having the ends thereof sealed, blanket pellet means and fuel pellet means positioned in predetermined locations within said fuel rod and operable during reactor operation to generate heat as well as fission gas, compression spring means within said rod to retain said pellet means in position within said rod prior to operation thereof, and space within said rod comprising elongated gas plenum means to receive fission gas which is evolved during reactor operation;

elongated gas bottle means positioned within said elongated gas plenum means and occupying the substantial portion of said elongated gas plenum means, said gas bottle means having an elongated wall portion spaced from the interior surface of said hollow cladding member to permit the passage of fission gas therebetween, and substantially all of said gas bottle means being impervious to the passage of fission gas therethrough;

gas pervious means provided through a small portion of said gas bottle means to permit fission gas introduced into said elongated gas plenum means during reactor operation to pass into said gas bottle means to equalize the fission gas pressure interiorly of and exteriorly of said gas bottle means, said gas pervious means being sufficiently restrictive to the flow of fission gas that in the event of any breach in the continuity of said cladding member which decreases the fission gas pressure exteriorly of said gas bottle means, the gas flow rate through said gas pervious means under maximum design pressure differential conditions is sufficiently restricted that fission gas release through the breach in said cladding member will not significantly reduce the heat transfer from said fuel rod and operating rods proximate thereto to the heat transfer liquid metal flowing therebetween.

3. The fuel rod as specified in claim 2, wherein said gas-pervious means comprises small aperture means provided in said gas bottle means.

4. The fuel rod as specified in claim 2, wherein an end portion of said gas bottle means is formed as a gas-pervious porous member.

5. The fuel rod as specified in claim 2, wherein an end portion of said gas bottle means is formed as a plurality of closely fitting disc means which are provided with offset aperture means therein to form said gas pervious means.

6. The fuel rod as specified in claim 2, wherein said gas-bottle means is positioned proximate the upper portion of said fuel rod.

7. The fuel rod as specified in claim 2, wherein said cladding member has a tubular configuration, said elongated wall portion of said gas bottle means is formed with a tubular configuration which interfits into said cladding member with a restricted gas path maintained between the inner surface of said cladding member and the outer surface of said elongated wall portion of said gas bottle means, and said elongated wall portion of said gas bottle means is positioned adjacent said compression spring means.

8. The fuel pin as specified in claim 7, wherein closure means seals the lower end of said elongated wall portion of said gas bottle means, and said gas pervious means is located proximate the upper end of said elongated wall portion of said gas bottle means.

9. The fuel pin as specified in claim 8, wherein the outer surface of said elongated wall portion of said gas bottle means is provided with longitudinal grooves to insure a gas path between the outer surface of said elongated wall portion and the inner surface of said cladding member.

10. The fuel rod as specified in claim 7, wherein said compression spring means is positioned above said gas bottle means.

* * * * *